United States Patent [19]

Canterino

[11] 4,216,301

[45] Aug. 5, 1980

[54] PROCESS FOR SOLUTION POLYMERIZATION OF ACRYLONITRILE

[75] Inventor: Peter J. Canterino, Towaco, N.J.

[73] Assignee: Mobil Oil Corporation, New York, N.Y.

[21] Appl. No.: 49,695

[22] Filed: Jun. 18, 1979

[51] Int. Cl.$^2$ ............................................. C08F 20/44
[52] U.S. Cl. .................................... 526/229; 526/341; 526/342
[58] Field of Search ...................... 526/229, 341, 342

[56] References Cited

U.S. PATENT DOCUMENTS

| | | | |
|---|---|---|---|
| 2,525,521 | 10/1950 | Caldwell | 526/342 |
| 2,640,049 | 5/1953 | Rothrock | 526/341 |
| 2,858,290 | 10/1958 | Davis et al. | 526/341 |
| 3,373,147 | 3/1968 | Izumi et al. | 526/341 |
| 3,380,976 | 4/1968 | Izumi et al. | 526/342 |
| 3,415,795 | 12/1968 | Molau et al. | 526/341 |
| 3,660,527 | 5/1972 | Sakai et al. | 526/341 |
| 4,052,355 | 10/1977 | Neukam et al. | 526/341 |

*Primary Examiner*—Harry Wong, Jr.
*Attorney, Agent, or Firm*—Charles A. Huggett; James F. Powers, Jr.; Hastings S. Trigg

[57] ABSTRACT

A 30–60% solution of acrylonitrile in dimethyl sulfoxide is polymerized using a redox catalyst system of water soluble bisulfite salt and a water soluble persulfate salt.

4 Claims, No Drawings

PROCESS FOR SOLUTION POLYMERIZATION OF ACRYLONITRILE

BACKGROUND OF THE INVENTION

1. Field of the Invention

This invention is directed to a method for polymerizing acrylonitrile in solution at relatively low temperatures.

2. Description of the Prior Art

As is well known in the art, acrylonitrile has been polymerized in solution, using peroxy or azo catalysts. Such catalysts, however, require polymerization temperatures above 50° C., usually in the order of 85° C. to 130° C. Insofar as now known, solution polymerization of acrylonitrile at lower temperatures, as described herein, has not been proposed.

SUMMARY OF THE INVENTION

This invention provides a process for polymerizing acrylonitrile that comprises carrying out the polymerization in a solution of between about 30 and about 60 weight percent acrylonitrile in dimethylsulfoxide in the presence of a redox system catalyst consisting essentially of a combination of a water-soluble bisulfite salt or a water-soluble metabisulfite salt and a water-soluble persulfate salt.

DESCRIPTION OF SPECIFIC EMBODIMENTS

The preferred monomer utilizable in the process of this invention is acrylonitrile. It is contemplated to use mixtures of acrylonitrile with other alkyl acrylates which contain at least about 80 weight percent, preferably at least about 95 weight percent, acrylonitrile. The alkyl acrylates include methyl(meth)acrylate, ethyl(meth)acrylate, butyl(meth)acrylate, and the like.

The preferred solvent used for the solution polymerization of this invention is dimethyl sulfoxide. Alternatively, the solvent can be succinonitrile or a mixture of dimethyl sulfoxide and dimethyl sulfone containing at least 50 weight percent dimethyl sulfoxide. The amount of acrylonitrile monomer that is dissolved in the dimethyl sulfoxide will be between about 30 percent and about 60 percent by weight, based upon the total weight of the solution.

The catalyst used in the process of this invention is an aqueous redox system of a water-soluble bisulfite salt or a water-soluble metabisulfite salt and a water-soluble persulfate salt. Utilizable bisulfites include ammonium bisulfite potassium bisulfite, and sodium bisulfite. The metabisulfites include potassium metabisulfite and sodium metabisulfite. The persulfates include ammonium persulfate, potassium persulfate, and sodium persulfate.

The amount of redox catalyst used will be between about 0.1 weight percent and about 2 weight percent based upon monomer and calculated on a dry basis. In practice, the redox catalyst components are introduced as aqueous solutions of 1–25 weight percent concentration.

The solution polymerization reaction is carried out at temperatures between about 40° C. and about 80° C., preferably about 40°–50° C. Generally, polymerization is completed in between about 2 hours and about 10 hours.

EXAMPLE

A solution was prepared containing 20 cc. dimethyl sulfoxide, 10 cc. acrylonitrile, 0.5 cc. 2% aqueous solution of sodium bisulfite, and 0.5 cc. 2% aqueous solution of potassium persulfate. This solution was allowed to sit for two hours at 40°–50° C. A very viscous solution light in color resulted.

A film cast from the resultant solution and biaxially oriented by the process described in U.S. Pat. No. 4,066,731 has properties similar to those set forth in said patent.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for polymerizing acrylonitrile that comprises carrying out the polymerization in a solution of between about 30 and about 60 weight percent acrylonitrile in dimethylsulfoxide in the presence of a redox system catalyst consisting essentially of a combination of a water-soluble bisulfite salt or a water-soluble metabisulfite salt and a water-soluble persulfate salt.

2. The process of claim 1, wherein said water-soluble bisulfite salt is sodium bisulfite.

3. The process of claim 1, wherein said water-soluble persulfate salt is potassium persulfate.

4. The process of claim 2, wherein said water-soluble persulfate salt is potassium persulfate.

* * * * *